United States Patent Office 3,213,070
Patented Oct. 19, 1965

3,213,070
ACRYLIC ESTER BICYCLO-(3.2.0)-HEPTAN-6-OL MONOMERS AND POLYMERS THEREOF
John R. Caldwell, Winston J. Jackson, Jr., and Edward H. Hill, Kingsport, Tenn., assignors to Eastman Kodak Company, Rochester, N.Y., a corporation of New Jersey
No Drawing. Filed Nov. 7, 1963, Ser. No. 322,035
16 Claims. (Cl. 260—83.5)

This invention relates to acrylic and methacrylic esters of bicyclo-(3.2.0)-heptan-6-ol and certain derivatives thereof, to their homopolymers, and to their copolymerizations with other ethylenically unsaturated compounds.

In the field of synthetic fibers, films, and protective coatings, the search for polymers which are more soluble in low-boiling-point solvents and more resistant to heat is a continuous one. The greater heat resistance affords, for example, more leeway in temperature control during processing steps such as drying, and of course, provides a more versatile and stable product, while the greater solubility in low-boiling solvents allows the use of lower temperatures for ridding the fibers of solvent during coating or dry-spinning operations.

Objects, therefore, of the present invention are: to provide polymeric materials having substantially improved solubility in low-boiling-point solvents and/or substantially improved heat resistance; to provide monomers readily polymerizable to these polymers; and to provide commercially practicable processes for preparing the monomers and polymers.

In a broad sense, these and other objects have been achieved in accordance with the present invention through the discovery that polymers prepared solely or partially from the acrylic and methacrylic esters of bicyclo-(3.2.0)-heptan-6-ol and certain derivatives thereof exhibit the aforesaid desirable properties and are readily processable into formed articles by conventional techniques such as extrusion.

The new monomeric esters have the following general formula:

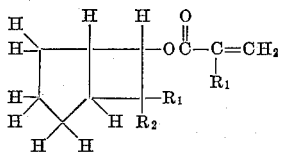

wherein $R_1$ and $R_2$ are each selected from the group consisting of hydrogen atoms, monovalent alkyl radicals containing from one to six carbon atoms, aryl, aralkyl, alkaryl and alicyclic radicals, and taken together with the adjacent bicyclo ring carbon, constitute a carbocyclic ring of from five to six carbon atoms, and wherein $R_3$ is selected from the group consisting of a hydrogen atom and a methyl group.

These new vinyl monomers are of course copolymerizable with a large number of ethylenically unsaturated compounds, examples of which are: the alkyl acrylates and methacrylates such as methyl acrylate, ethyl acrylate, butyl methacrylate and methyl methacrylate; derivatives of olefinic dibasic acids such as the maleates, maleamides, maleamates and maleimides; the esters, amides and ester-amides of fumaric, itaconic and citraconic acids; vinyl ethers and vinyl ketones; the vinyl derivatives of benzene such as styrene, α-methylstyrene, p-acetaminostyrene, p-methylstyrene and α-acetoxystyrene; polymerizable nitriles such as acrylonitrile and α-methacrylonitrile; halogenated compounds such as vinyl chloride, vinyl fluoride, vinylidene fluoride, tetrafluoroethylene and chlorotrifluoroethylene; ethylene, isobutylene, N-vinyl imides, N-vinyl lactams, isopropenyl acetate; the amides, N-alkaylamides and N,N-dialkylamides of acrylic and methacrylic acids; and diolefinic compounds such as butadiene, isoprene, 2,3-dimethylbutadiene, 2-chlorobutadiene, 2-cyanobutadiene, 2-phenylbutadiene and 2-acetoxybutadiene.

In more general terms, the compounds copolymerizable with the new vinyl monomers may be typified by their having —CH=C<, $CH_2$=C<, or

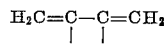

unsaturation. For a further listing of specific useful comonomers see U.S. Patents 2,396,785 and 2,737,369. It must be realized that the utility of some of these comonomers as well as their copolymerizability may be marginal and may exist, for example, only in ternary systems. This however, does not detract from the broad applicability of the new vinyl monomers to an almost infinite variety of polymeric systems.

In a more specific sense, it has been discovered that especially useful polymers may be obtained through the homopolymerizations of the new vinyl monomers and also through the copolymerizations of one or more thereof with acrylonitrile.

MONOMER PREPARATION IN GENERAL

The new vinyl esters (V) may be prepared according to the following reaction series:

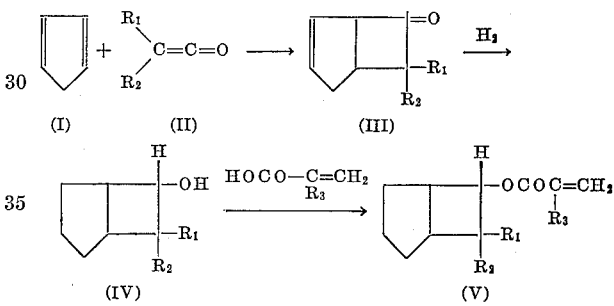

wherein $R_1$, $R_2$, and $R_3$ are as above defined. It is noted that the alkyl groups $R_1$ and $R_2$ include, for example, methyl, ethyl, isopropyl, butyl; and $R_1$ and $R_2$ may be different ones of such groups. In this reaction series, the dialkylketene (II) prepared by pyrolysis of dialkylacetic acid anhydrides as disclosed in Canadian Patent 618,772, is reacted with cyclopentadiene (I) according to the method of Staudinger and Meyer, Helv. Chim. Acta, 7, 21 (1924) to give the 7,7-dialkylbicyclo-(3.2.0)-heptan-6-ones (III). These ketones are then reduced in the presence of hydrogenation catalysts at elevated temperatures with hydrogen under pressure to the saturated carbinols (IV). The acrylates and methacrylates are obtained by refluxing a mixture containing the acid, carbinol, inert solvent such as benzene, xylene or toluene, an acidic catalyst such as $H_2SO_4$ or toluenesulfonic acid, and polymerization inhibitor such as methylene blue or hydroquinone. The water formed is removed in the benzene azeotrope and collected in a Dean-Stark trap. A slight excess of the acid insures completeness of reaction.

EXAMPLES OF MONOMER PREPARATION

Example 1

7,7-dimethylbicyclo-(3.2.0)-hept-3-en-6-one, having a boiling point of 56–58° C. at 8 mm. pressure, was prepared by the addition of cyclopentadiene to dimethylketene substantially as described by Staudinger and Meyer in Helv. Chim. Acta, 7, 21 (1924). The dimethylketene was obtained by cracking isobutryic anhydride. The unsaturated ketone was then reduced over a commercially available nickel hydrogenation catalyst at 150° C. with hydrogen at 1500 p.s.i. to 7,7-dimethylbicyclo-(3.2.0)-heptan-6-ol. The conversion to the acrylate was made by refluxing a mixture containing 126 g. (0.90 mole) of the carbinol, 72 g. (1.0 mole) of acrylic acid, 3.6 g. of methylene blue, 10 g. of p-toluene sulfonic acid, and 400 ml. of benzene until no more water collected in a Dean-Stark trap filled with benzene and attached to the flask. The solution was then cooled, washed with sodium bicarboate solution and water, and dried with sodium sulfate. After evaporation of the solvent, the ester product was distilled through a short Vigreux column and consisted of a colorless liquid boiling at 76–78° C. at 3 mm. pressure. Its index of refraction $[n_D^{20}]$ was 1.4713. Analytical results were as follows: Calculated for $C_{12}H_{18}O_2$: C, 74.2; H, 9.3. Found: C, 73.99; H, 9.29.

*Example 2*

An ester was prepared by the procedure of Example 1 using methacrylic acid instead of acrylic. The product distilled at 98–105° C. at 5.5–6.5 mm. pressure and had an index of refraction $[n_D^{20}]$ of 1.4717. Analytical results were as follows: Calculated for $C_{13}H_{20}O_2$: C, 75.0; H, 9.6. Found: C, 75.33; H, 9.67.

*Example 3*

7,7-methylethylbicyclo-(3.2.0)-heptan-6-ol was prepared by the procedure of Example 1. The methyletheylketene reactant was obtained by cracking 2-methylbutyric anhydride. Esterification of acrylic acid was carried out as in Example 1. The product distilled at 98–101° C. at 5 mm. pressure.

*Example 4*

7,7-ethylbutylbicyclo-(3.2.0)-heptan-6-ol was prepared by the procedure of Example 1. The ethylbutylketene reactant was obtained by cracking 2-ethylhexanoic anhydride. Esterification of acrylic acid was carried out as in Example 1. The product distilled at 78–82° C. at 0.8 mm. pressure.

*Example 5*

The phenylated ketones, particularly diphenylbicyclo-(3.2.0)-hept-3-en-6-one, may be prepared as described in J. Am. Chem. Soc., 61, 10 (1939). The unnsaturated ketone is then hydrogenated to the saturated carbinol and esterified by the procedure of Example 1.

*Example 6*

Spiro[bicyclo - (3.2.0) - heptane - 7,1' - cyclopent - 6-yl] acrylate and methacrylate are prepared from tetramethyleneketene by the procedures of Examples 1 and 2, respectively. The methacrylate distills at 97–101° C./3 mm.

*Example 7*

Spiro[bicyclo - (3.2.0) - heptane - 7,1' - cyclohex - 6-yl] acrylate was prepared from pentamethyleneketene by the process of Example 1 and distills at 80–84° C./1 mm.

POLYMER PREPARATION IN GENERAL

The homopolymers and copolymers of the invention are prepared by any of the techniques known to those skilled in the art, for example, emulsion, solution or bulk polymerization. The technique chosen will of course depend upon desired yield, reaction rates, and so forth. Emulsion polymerization is particularly expedient and involves dispersing the monomers in water and adding suitable dispersing agents and catalysts. The total amount of the acrylate and/or methacrylate which is incorporated into the copolymers depends of course upon the polymer properties desired. In certain instances, one percent by weight may suffice while in others, ninety or more percent may be required to impart the improved heat resistance and/or solubility to the polymer.

In general, the homopolymers of the invention are soluble in chlorinated hydrocarbons such as methylene chloride, ethylene chloride, and tetrachloroethylene. Aromatic hydrocarbons such as benzene, toluene and the like are also solvents. The fiber-forming copolymers with acrylonitrile are soluble in dimethylformamide, ethylene carbonate, dimethylsulfoxide, and γ-butyrolactone. The copolymers with acrylates and methacrylates are soluble in chlorinated hydrocarbons. The copolymers with vinyl chloride are soluble in dioxane or mixtures of dioxane and chlorinated hydrocarbons.

Many suitable polymerization catalysts are available and include the free radical types such as: inorganic peroxygen compounds represented by $H_2O_2$ and the alkali metal persulfates, perborates and percarbonates; organic peroxygen compounds represented by diacetyl peroxide, lauroyl peroxide, dibenzoyl peroxide and tertiary butyl peroxide; azo compounds represented by α,α'-azobisisobutyronitrile and p-methoxybenzene diazo thio-2-naphthyl ether; and redox systems represented by lauroyl peroxide-triphenylamine and ammonium persulfate-sodium bisulfite.

Representative dispersing agents which may be used in the emulsion polymerizations include sodium dodecyl sulfate, sodium octadecyl sulfate, soaps, sulfonated mineral oil, sulfonated aromatic compounds and the like. The solution of polymerizations may be carried out in organic solvents such as the lower alcohols, e.g., tert-butyl alcohol, ketones, esters, aromatic or aliphatic hydrocarbons, dioxane, glycolmonoethers and the like.

EXAMPLES OF POLYMER PREPARATION

*Example 8*

The following materials were placed in a pressure bottle and tumbled in a constant-temperature water bath for 24 hours at 50° C.:

| | |
|---|---|
| 7,7-dimethylbicyclo-(3.2.0)-hept-6-yl acrylate ___g__ | 5 |
| Tert-butyl alcohol _____ml__ | 20 |
| 2,2'-azobis(2-methylpropionitrile) _____g__ | 0.1 |

The product separated as a white powder which, after washing with isopropyl alcohol and drying, weighed 4.2 g. Films cast from methylene chloride had a hot bar sticking point of about 160° C.

*Example 9*

The recipe and procedure of Example 8 was followed except that the methacrylate rather than the acrylate ester was used. The polymer had a hot bar sticking range of about 170–178° C.

*Example 10*

The following materials were placed in a pressure bottle and tumbled at 50° C. for 20 hours:

| | |
|---|---|
| Acrylonitrile _____g__ | 32 |
| 7,7-dimethylbicyclo-(3.2.0)-hept-6-yl acrylate ___g__ | 8 |
| Water _____ml__ | 200 |
| Lauryl sulfate _____g__ | 0.8 |
| Ammonium persulfate _____g__ | 0.4 |
| Sodium bisulfite _____g__ | 0.2 |
| Tert-dodecyl mercaptan _____g__ | 0.2 |

The resulting polymer was filtered, washed with water and acetone, and dried. The product weighed 37.5 g. and a nitrogen analysis showed it contained 81 percent acrylonitrile. It was dissolved in γ-butyrolactone and wet spun into fibers having a tenacity of 3.32 g./den., an elongation of 16 percent, a sticking point of about 218° C. and a flow point of about 228° C. at 0.2 g./den. The fibers dyed to deep shades with disperse dyes. In comparison, fibers made from a copolymer of 80% acrylonitrile and 20% 2-ethylhexyl acrylate had a hot bar sticking point of about 185° C. and a flow point of about 190° C.

*Example 11*

Using the method of Example 8, a copolymer was prepared comprising 75 parts of acrylonitrile and 25 parts of 7,7-dimethylbicyclo-(3.2.0)-hept-6-yl methacrylate. The polymer was compression molded into buttons having the following properties:

| | | |
|---|---|---|
| Modulus | p.s.i. | $3.57 \times 10^5$ |
| Elongation | percent | 13 |
| Tensile strength | p.s.i. | 8400 |
| Heat distortion temperature | °C | 129 |

*Example 12*

Using the method of Example 10, a copolymer was prepared comprising 82 parts of acrylonitrile and 18 parts of 7,7-methylethylbicyclo-(3.2.0)-hept-6-yl acrylate. It was dissolved in dimethylformamide and dry spun into fibers having the following properties:

| | | |
|---|---|---|
| Tenacity | g./den. | 3.8 |
| Elongation | percent | 18 |
| Hot bar sticking temperature | °C | 229 |
| Flow point at 0.2 g./den. | °C | 240 |

*Example 13*

A polymer comprising 70 parts of methyl methacrylate and 30 parts of 7,7-ethylbutylbicyclo-(3.2.0)-hept-6-yl methacrylate was prepared as in Example 8. It was molded to give clear, hard buttons which had a heat distortion temperature of 160° C.

*Example 14*

The following materials were placed in a pressure bottle and tumbled at 50° C. for 18 hours:

| | | |
|---|---|---|
| 7,7-ethylbutylbicyclo-(3.2.0)-hept-6-yl methacrylate | g. | 60 |
| Vinyl chloride | g. | 40 |
| Sulfonated mineral oil | g. | 2.0 |
| Ammonium persulfate | g. | 1.0 |
| Water | ml. | 800 |

The product separated as a white powder which, after washing and drying, weighed 85 g. The polymer was soluble in cyclohexanone and gave clear, tough films.

*Example 15*

Fibers made from a copolymer comprising 70 parts of acrylonitrile and 30 parts of 7,7-dimethylbicyclo-(3.2.0)-hept-6-yl methacrylate had a hot bar sticking point of 208° C. and a flow point of 221° C. In comparison, fibers made from a copolymer of 70 parts of acrylonitrile and 30 parts of octylmethacrylate had a sticking temperature of 90° C. and a flow point of 140° C.

*Example 16*

The following materials were placed in an autoclave:

| | | |
|---|---|---|
| 7,7-diethylbicyclo-(3.2.0)-hept-6-yl acrylate | g. | 25 |
| Butadiene | g. | 75 |
| Soap | g. | 3.0 |
| Potassium persulfate | g. | 1.0 |
| Water | ml. | 400 |

The mixture was stirred at 65° C. for 48 hours. The product was a rubbery material that weighed 89 g.

*Example 17*

By substituting 7,7-diphenylbicyclo-(3.2.0)-hept-6-yl acrylate for the acrylate in the recipe of Example 10, a copolymer may be prepared comprising about 70% acrylonitrile and 30% of the substituted acrylate. The copolymer may be dissolved in acetonitrile and dry spun into fibers having the following properties: 2.85 g./den., 19% elongation, sticking point 180° C., flow point of 180° C. at 0.2 g./den.

*Example 18*

By substituting spiro[bicyclo-(3.2.0)-heptane-7,1'-cyclopent-6-yl] methacrylate for the ester of Example 8, a homopolymer was prepared. Films cast from a solution of this polymer in methylene chloride have a hot bar sticking point of 178–180° C.

*Example 19*

By copolymerizing spiro[bicyclo-(3.2.0)-heptane-7,1'-cyclohex-6-yl] acrylate with methyl acrylate in a 50/50 weight ratio according to the procedure of Example 10, the copolymer formed may be compression molded into buttons having a heat-distortion temperature of 124° C. at 66 p.s.i.

Although the invention has been described in detail with particular reference to preferred embodiments thereof, variations and modifications can be effected within the spirit and scope of the invention as described hereinabove and as defined in the appended claims.

We claim:

1. A compound of the formula

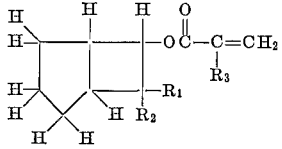

wherein $R_1$ and $R_2$ are each selected from the group consisting of hydrogen atoms, monovalent alkyl radicals containing from one to six carbon atoms and aryl radicals, and taken together with the adjacent bicyclo ring carbon constitute a carbocyclic ring of from five to six carbon atoms, and wherein $R_3$ is selected from the group consisting of a hydrogen atom and a methyl group.

2. A compound of the formula of claim 1 wherein $R_1$ and $R_2$ are each a methyl radical.

3. A compound of the formula of claim 1 wherein one of $R_1$ and $R_2$ is a methyl radical and the other is an ethyl radical.

4. A compound of the formula of claim 1 wherein one of $R_1$ and $R_2$ is an ethyl radical and the other is a butyl radical.

5. A compound of the formula of claim 1 wherein $R_1$ and $R_2$ are each a phenyl radical.

6. A compound of the formula of claim 1 wherein $R_1$ and $R_2$ together with the adjacent bicyclo ring carbon constitute a carbocyclic ring of five carbon atoms.

7. A compound of the formula of claim 1 wherein $R_1$ and $R_2$ together with the adjacent bicyclo ring carbon constitute a carbocyclic ring of six carbon atoms.

8. A homopolymer of a compound of claim 1.

9. A copolymer of a compound of claim 1 with at least one unsaturated compound copolymerizable therewith.

10. A copolymer of a compound of claim 1 with compound selected from the group consisting of acrylonitrile, methyl methacrylate, vinyl chloride and butadiene, and mixtures thereof.

11. The copolymer obtained by the polymerization of the compound of claim 5 with a compound selected from the group consisting of acrylonitrile, methyl methacrylate, vinyl chloride and butadiene, and mixtures thereof.

12. The copolymer obtained by the polymerization of the compound of claim 6 with a compound selected from the group consisting of acrylonitrile, methyl methacrylate, vinyl chloride and butadiene, and mixtures thereof.

13. The copolymer obtained by the polymerization of the compound of claim 7 with a compound selected from the group consisting of acrylonitrile, methyl methacrylate, vinyl chloride and butadiene, and mixtures thereof.

14. The copolymer obtained by the polymerization of the compound of claim 8 with a compound selected from the group consisting of acrylonitrile, methyl methacrylate, vinyl chloride and butadiene, and mixture thereof.

15. The copolymer obtained by the polymerization of the compound of claim 9 with a compound selected from the group consisting of acrylonitrile, methyl methacrylate, vinyl chloride and butadiene, and mixtures thereof.

16. The copolymer obtained by the polymerization of the compound of claim 10 with a compound selected from the group consisting of acrylonitrile, methyl methacrylate, vinyl chloride and butadiene, and mixtures thereof.

No reference cited.

JOSEPH L. SCHOFER, *Primary Examiner.*

DONALD E. CZAJA, *Examiner.*

UNITED STATES PATENT OFFICE
CERTIFICATE OF CORRECTION

Patent No. 3,213,070                            October 19, 1965

John R. Caldwell et al.

It is hereby certified that error appears in the above numbered patent requiring correction and that the said Letters Patent should read as corrected below.

Column 6, line 65, for the claim reference numeral "5" read -- 2 --; line 69, for the claim reference numeral "6" read -- 3 --; line 73, for the claim reference numeral "7" read -- 4 --; column 7, line 2, for the claim reference numeral "8" read -- 5 --; line 6, for the claim reference numeral "9" read -- 6 --; column 8, line 1, for the claim reference numeral "10" read -- 7 --.

Signed and sealed this 20th day of September 1966.

(SEAL)
Attest:

ERNEST W. SWIDER                                           EDWARD J. BRENNER
Attesting Officer                                                 Commissioner of Patents